United States Patent [19]
Importico

[11] Patent Number: 5,551,576
[45] Date of Patent: Sep. 3, 1996

[54] DISPOSAL SYSTEM FOE USE IN TALL BUILDINGS

[76] Inventor: Michael Importico, P. O. Box 810, Mays Landing, N.J. 08330

[21] Appl. No.: 386,575

[22] Filed: Feb. 10, 1995

[51] Int. Cl.$^6$ ...................................................... B07C 7/04
[52] U.S. Cl. ........................ 209/705; 209/706; 209/908; 209/930; 209/942; 193/2 R; 414/798.1
[58] Field of Search .................................... 209/630, 702, 209/703, 704, 705, 706, 707, 911, 919, 930, 942, 908; 232/43.1, 43.2, 43.4, 43.5; 193/2 A, 2 R, 29; 414/795.6, 797.4, 798.1

[56] References Cited

U.S. PATENT DOCUMENTS

| | | | |
|---|---|---|---|
| 2,177,328 | 10/1939 | Pender . | |
| 2,792,171 | 2/1971 | Rosset . | |
| 3,713,581 | 1/1973 | Mullens . | |
| 3,893,615 | 7/1975 | Johnson . | |
| 4,114,776 | 9/1978 | Pluss . | |
| 4,640,403 | 2/1987 | McDermott | 193/34 |
| 4,987,988 | 1/1991 | Messina | 193/2 R |
| 5,031,829 | 7/1991 | Shantzis | 209/706 X |
| 5,127,507 | 7/1992 | McDermott | 193/2A X |
| 5,155,976 | 10/1992 | Okabe et al. . | |
| 5,190,165 | 3/1993 | Garfield, Jr. | 209/930 X |
| 5,228,577 | 7/1993 | Wilson | 209/702 |
| 5,253,766 | 10/1993 | Sims | 209/702 |
| 5,257,577 | 11/1993 | Clark | 209/706 X |
| 5,259,304 | 11/1993 | Roberts | 100/99 |
| 5,271,507 | 12/1993 | Evans, Jr. | 209/930 X |
| 5,316,152 | 5/1994 | Ross | 209/630 |
| 5,366,097 | 11/1994 | Hazelwood | 209/704 |
| 5,425,458 | 6/1995 | Gilcreest et al. | 209/702 X |

FOREIGN PATENT DOCUMENTS 4215799  11/1993  Germany ................................ 209/911

Primary Examiner—William E. Terrell
Assistant Examiner—Tuan Nguyen
Attorney, Agent, or Firm—Caesar, Rivise, Bernstein Cohen & Pokotilow, Ltd.

[57] ABSTRACT

A system to separate and store trash which has been segregated into various categories for use in a multi-floor building. The system has a vertical waste chute with at least one access door to the chute located at each floor of the building. The chute has an upper and lower portion and two paths therethrough. The first path permits vertical disposal of the trash and the second path is angled to the first to permit designated trash to follow a different pathway for disposal. The system further includes a diverter located adjacent the lower portion of the chute for diverting the path of the trash placed into the chute from a first location containing a plurality of trash receptacles located on a platform to a second location having at least one trash receptacle, such as a trash compactor. The system also includes a receptacle mover to move a selected trash receptacle beneath the chute to receive a particular category of trash deposited into the chute. A controller controls the receptacle mover and includes a selector to select the particular category of trash to be deposited into the access door and an indicator to indicate the category selected. The selector and indicator located adjacent each access door. The controller is operatively connected to the receptacle mover to selectively control the receptacle mover. The system also includes a dispenser to place an empty receptacle onto the platform to replace a receptacle which is removed from the platform after the receptacle is filled with trash. The system further includes a replacing mechanism to removing a receptacle filled with trash from the platform to allow the dispenser to dispense an empty receptacle onto the platform. The replacing mechanism includes a sensor to sense when a receptacle on the platform is filled with trash and needs to be replaced with an empty receptacle. Each access door to the chute includes a locking mechanism connected to each door to lock it while the receptacle moving mechanism is in motion and to prevent another person from depositing trash into another access door.

6 Claims, 5 Drawing Sheets

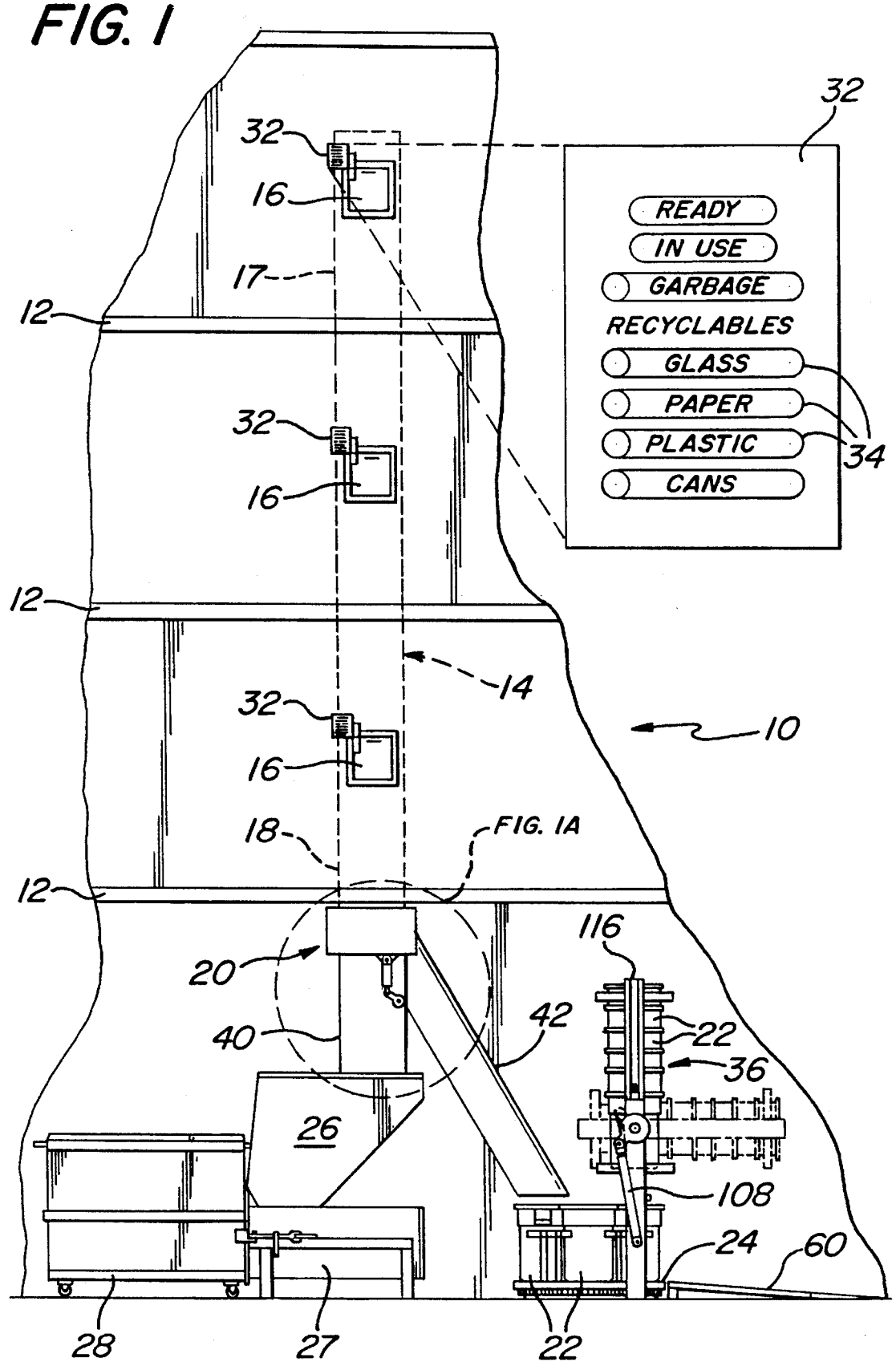

DISPOSAL SYSTEM FOE USE IN TALL BUILDINGS

BACKGROUND OF THE INVENTION

This invention relates to a solid waste trash separation system for use in tall buildings to permit the tenants to dispose of their recyclable materials so that they are separated into various bulk receptacles in the building's basement, when the trash is placed into a trash chute located on each floor. The tenant controls the trash system which permits the trash to be delivered into different containers depending upon the type of trash.

State and local governments are now requiring that trash be separated and certain portions recycled when it is disposed of, e.g., colored glass, clear glass, plastic containers, newspapers, metal cans and unrecyclable materials. While this may seem like a simple task for the average homeowner, it can be daunting when individuals living in high-rise apartment complexes are required to separate their trash. If a tenant disposes of all trash into a single, typical trash chute found in many apartment buildings, that trash empties into a single basement trash dumpster and must then be separated by building management, an often time-consuming and unpleasant task.

Various types of prior art chutes, trash receptacles and systems are known in the art. For example, U.S. Pat. No. 4,987,988 (Messina) shows a recycling system using a chute. U.S. Pat. No. 3,893,615 (Johnson) and U.S. Pat. No. 4,114,776 (Pluss) show recycling receptacles. U.S. Pat. No. 2,792,171 (Rosset), U.S. Pat. No. 2, 177,328 (Pender), U.S. Pat. No. 5,253,766 (Sims) and U.S. Pat. No. 3,713,581 (Mullens) show waste disposal chutes. U.S. Pat. No. 4,640, 403 (McDermott) shows a chute and German Patent No. 2,407,482 (Borner) shows a waste disposal system for a multi-story building. U.S. Pat. No. 5,316,152 (Ross) shows a high rise recycling system, U.S. Pat. No. 5,155,976 (Okabe et al.) show a conveyor system of dust containers used in tall buildings. U.S. Pat. No. 5,228,577 (Wilson) shows an apparatus for separating household trash. Other patents relating to recyling of materials are U.S. Pat. No. 5,190,165 (Garfield, Jr.), U.S. Pat. No. 5,257,577 (Clark), U.S. Pat. No. 5,259,304 (Roberts), U.S. Pat. No. 5,271,507 (Evans, Jr.) and U.S. Pat. No. 5,366,097 (Hazelwood).

U.S. Pat. No. 5,031,829 (Shantzis) shows a system which uses a single chute in a multi-story building to collect into separate receptacles, different categories of wastes already separated by the tenant for recycling. A turntable carries a large receptacle for each category of waste. Control means on each floor enables a tenant to operate the turntable to position a selected receptacle beneath the turntable to receive a particular category of waste. A microprocessor controller and interlocks on the access doors prevent conflicts between floors. While this system appears suitable for its intended purposes, it does not directly dispense sorted trash into a trash compactor and/or dumpster system which is typically already in place in existing buildings. Therefore, installation of the system of U.S. Pat. No. 5,031,829 would render such expensive items obsolete. Alternatively, that system would require that trash from a particular receptacle be manually lifted into a compactor and dumpster system, which requires manual labor and can be injurious to a worker lifting heavy barrels of trash. This is the system which appears to be distributed by Hi-Rise Recycling Systems, Inc., 16255 N.W. 54th Avenue, Miami, Fla. under the trademark High-Rise Recycling System.

Accordingly, a need exists for a recycling trash system to be used in existing and new constructions, which utilizes a diverting mechanism between recyclables and non-recyclable waste which is emptied into a typical trash compactor and dumpster system.

OBJECTS OF THE INVENTION

Accordingly, it is a general object of this invention to provide a recycling trash system which overcomes the disadvantages of the prior art.

It is a further object of this invention to provide a recycling trash system which allows a tenant located on each floor of a high-rise building to separate recyclables and dump them into a common trash chute for automatic separation in the various assigned receptacles.

It is another object of this invention to provide a recycling trash system which has a lock-out mechanism to prevent multiple tenants located on different floors from simultaneously placing trash into the trash chute for safety reasons and to ensure that the trash is dispensed into the proper receptacle.

It is yet another object of this invention to provide a recycling trash system which prevents the user from inserting the separated trash into the chute until the properly assigned receptacle is located beneath the chute and is capable of receiving additional trash.

It is a further object of this invention to provide a recycling trash system which avoids the labor costs to separate recyclables and to pick up recyclables on each building floor and then transfer them to a single disposal location.

It is a still further object of this invention to provide a recycling trash system which is utilizable with a pre-existing trash compactor and dumpster system located in an existing building.

It is another object of this invention to provide a trash system which also contains a smoke detector for safety reasons.

It is yet another object of this invention to provide a trash system which automatically replaces a receptacle filled with a recyclable material with an empty receptacle to minimize supervision of the system by building maintenance personnel.

SUMMARY OF THE INVENTION

These and other objects of this invention are achieved by providing a system to separate and store trash which has been segregated into various categories for use in a multi-floor building. The system comprises a vertical waste chute with at least one access door to the chute. The chute has an upper and lower portion and two paths therethrough. The first path permits vertical disposal of the trash and the second path is angled to the first to permit designated trash to follow a different pathway for disposal. The system further includes a diverter located adjacent the lower portion of the chute for diverting the path of the trash placed into the chute from a first location containing a plurality of trash receptacles located on a platform to a second location having at least one trash receptacle, such as a trash compactor. The system also includes a receptacle mover to move a selected trash receptacle beneath the chute to receive a particular category of trash deposited into the chute. A controller controls the receptacle mover and includes a selector to select the particular category of trash to be deposited into the access door and an indicator to indicate the category selected. The selector and indicator located adjacent each access door. The controller is operatively connected to the receptacle mover to selectively control the receptacle mover. The system also includes a dispenser to place an empty receptacle onto the platform to replace a receptacle which is removed from the platform after the receptacle is filled with trash. The system further includes a replacing mechanism to removing a receptacle filled with trash from the platform to allow the dispenser to dispense an empty receptacle onto the platform. The replacing mechanism includes a sensor to sense when a receptacle on the platform is filled with trash and needs to be replaced with an empty receptacle. Each access door to the chute includes a locking mechanism connected to each door to lock it while the receptacle moving means is in motion and to prevent another person from depositing trash into another access door.

The system further includes a door sensor at each access door for sensing when the door is open and is operatively connected to the controller to affect operation based on the condition of a door being open. The controller locks all of the access doors except a particular door adjoining a selector from which a selection has been most recently made for a predetermined time interval related to the opening of the particular door. The receptacle mover includes a platform of the turntable type and a category selector to ensure that a receptacle dedicated from a particular category of waste is always located in a particular location in the receptacle mover.

DESCRIPTION OF THE DRAWINGS

Other objects and many attendant features of this invention will become readily appreciated as the same becomes better understood by reference to the following detailed description when considered in connection with the accompanying drawings wherein:

FIG. 1 is a perspective view, partially diagrammatic of varying scale, of the system of the present invention with an enlarged control panel of the type found on each floor of a multi-story building.

DETAILED DESCRIPTION OF THE PREFERRED EMBODIMENTS

Figure 1A:
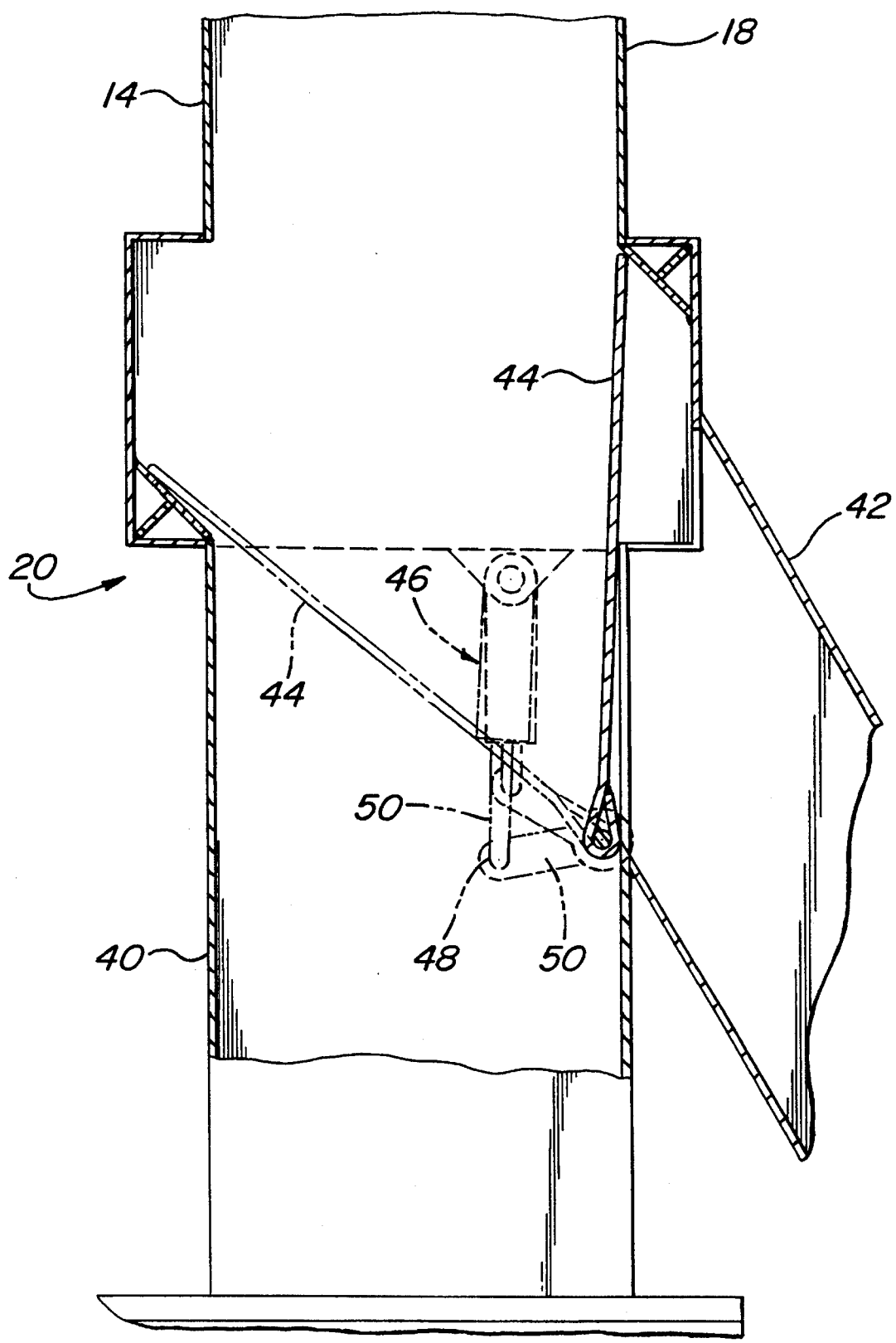
FIG. 1A is an enlarged partial side view of the diverting mechanism of Fig. 1, partially in phantom to show the two positions of the diverting mechanism.

Referring now to various figures of the drawings where like reference numerals refer to like parts, there is shown in FIG. 1, a system 10 constructed in accordance with this invention. The system 10 separates and stores trash which has been segregated into various categories for use in a building having multiple floors 12.

The system 10 comprises a vertical waste chute 14 (in phantom) with at least one access door 16 to the chute 14 located on a floor 12 of the building. The chute 14 has an upper portion 17 and lower portion 18 and a path therethrough. The system 10 further includes diverter mechanism 20 located adjacent the lower portion of the chute for diverting the path of the trash placed into the chute, from a first location containing a plurality of trash receptacles 22 located on a rotating platform 24 to a second location having at least one trash receptacle, such as the hopper 26 of a trash compactor 27 which may empty into a typical rear loading trash dumpster or container 28.

The system 10 also includes a platform rotating mechanism 30 (FIG. 3) to rotate platform 24 found beneath the lower end 18 of the chute 14 to position a receptacle 22 to receive a particular category of trash deposited into the chute 14. A controller (not shown) controls the platform rotating mechanism 30 and communicates with a selector control panel 32 as shown in FIG. 1, to select the particular category of trash to be deposited into the access door 16 and an indicator 34 to indicate the category selected. The selector 32 and indicator 34 are each located adjacent each access door 16. The controller (not shown) is operatively connected to the platform rotating mechanism 30 to selectively control it to properly position the chosen receptacle 22 to receive the designated trash.

Figure 2:
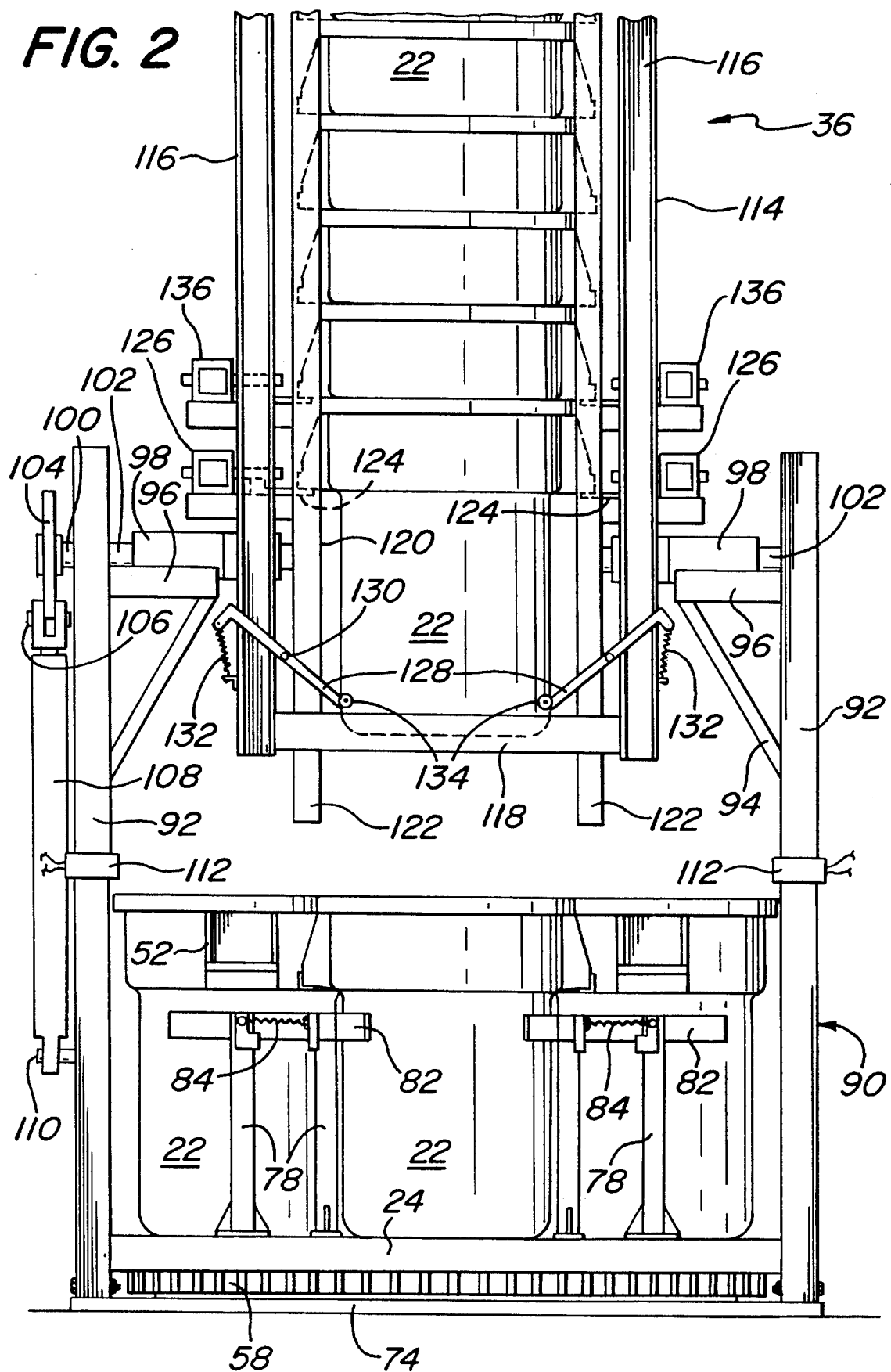
FIG. 2 is an enlarged sectional perspective view of a plurality of nested trash receptacles stored in a receptacle storage and replacement mechanism above the rotating platform holding a plurality of receptacles.

The system 10 also includes a trash receptacle dispenser 36 as shown in FIG. 2, to store and place empty receptacles 22 onto the platform 24 as needed, to replace a receptacle 22 which is removed from the platform 24 after the receptacle 22 is filled with trash.

As described in further detail below, the replacing mechanism 38 removes a filled receptacle 22 from the rotating platform 24 to allow the dispenser 36 to dispense an empty receptacle 22 onto the platform 24. The replacing mechanism 38 includes a sensor 112 to sense when a receptacle 22 on the platform 24 is filled with trash and needs to be replaced with an empty receptacle 22 from the dispenser. Each access door 16 to the chute 14 includes a locking mechanism (not shown) connected to each door to lock it while the platform rotating mechanism 30 is in motion for a relatively short time period and to prevent another person from depositing trash into another access door 16.

The system 10 further includes a door sensor (not shown) at each access door 16 for sensing when the door 16 is open and is operatively connected to the controller (not shown) to affect operation based on the condition of a door 16 being open. The controller locks all of the access doors 16 except a particular door adjoining a selector from which a selection has been most recently made for a predetermined time interval related to the opening of the particular door. Should an access door remain open, even accidentally, the system 10 will shut down as controlled by the controller (not shown). The platform rotating mechanism 30 rotates the platform 24 of the turntable type to ensure that a receptacle 22 dedicated from a particular category of waste is always located in a desired location.

As shown in more detail in FIG. 1A, the lower portion 18 of the vertical waste chute 14 is adjacent the diverting mechanism 20. The diverting mechanism 20 diverts trash placed into an access door 16 into the appropriate path. The path for the deposited trash is automatically selected by the tenant by pressing the appropriate button on the selector panel 32 on each floor of the building. In the embodiment shown in FIGS. 1 and 1A, there are two actual trash paths, the vertical path 40 and the angled path 42. Other types and numbers of paths may vary in various embodiments of the invention depending upon the particular configuration desired. The vertical path 40 terminates to deposit trash into hopper 26 which communicates with trash compactor 27, which empties into a typical rear load container 28. One type of trash which might follow such a path is non-recyclable trash or garbage which is compacted and then removed from the building to ultimately be burned, etc., although obviously this can be varied depending upon the circumstances of use. Alternatively, by use of the diverting mechanism 20, the trash can be diverted into angled chute 42 and into the various receptacles 22 found on rotating platform 24. The diverting mechanism 20 is actuated by the tenant when the tenant chooses the type of trash to be deposited into the access door 16 by pressing the desired indicator button 34 on selector panel 32. The selector panel 32 communicates with the controller (not shown) to control both the diverting mechanism 20 and the platform rotating mechanism 30 so that the trash is deposited into the assigned receptacle 22 or hopper 26.

The specific design of the diverting mechanism 20 can be greatly varied depending upon the design and circumstances of use and accordingly, the diverting mechanism 20 shown in FIG. 1A is merely exemplary and not meant to limit the present invention. The diverting mechanism 20 of FIG. 1A, includes flap 44 which is controlled by a solenoid (not shown) or other means to move lever mechanism 46, via arm 48 comprised of legs 50, so that the flap 44 moves from a first and generally vertical position to divert trash in the vertical path 40 to a second and generally angled position to divert trash in the angled path 42.

When the trash follows the angled path 42, the segregated trash will be deposited into the selected receptacle 22, which the tenant previously chose by means of the selector panel 32. In order to orient the designated receptacle 22 under the opening of the angled chute 42, the platform 24, upon which the plurality of receptacles 22 are placed, must be moved into the proper position.

Figure 3:
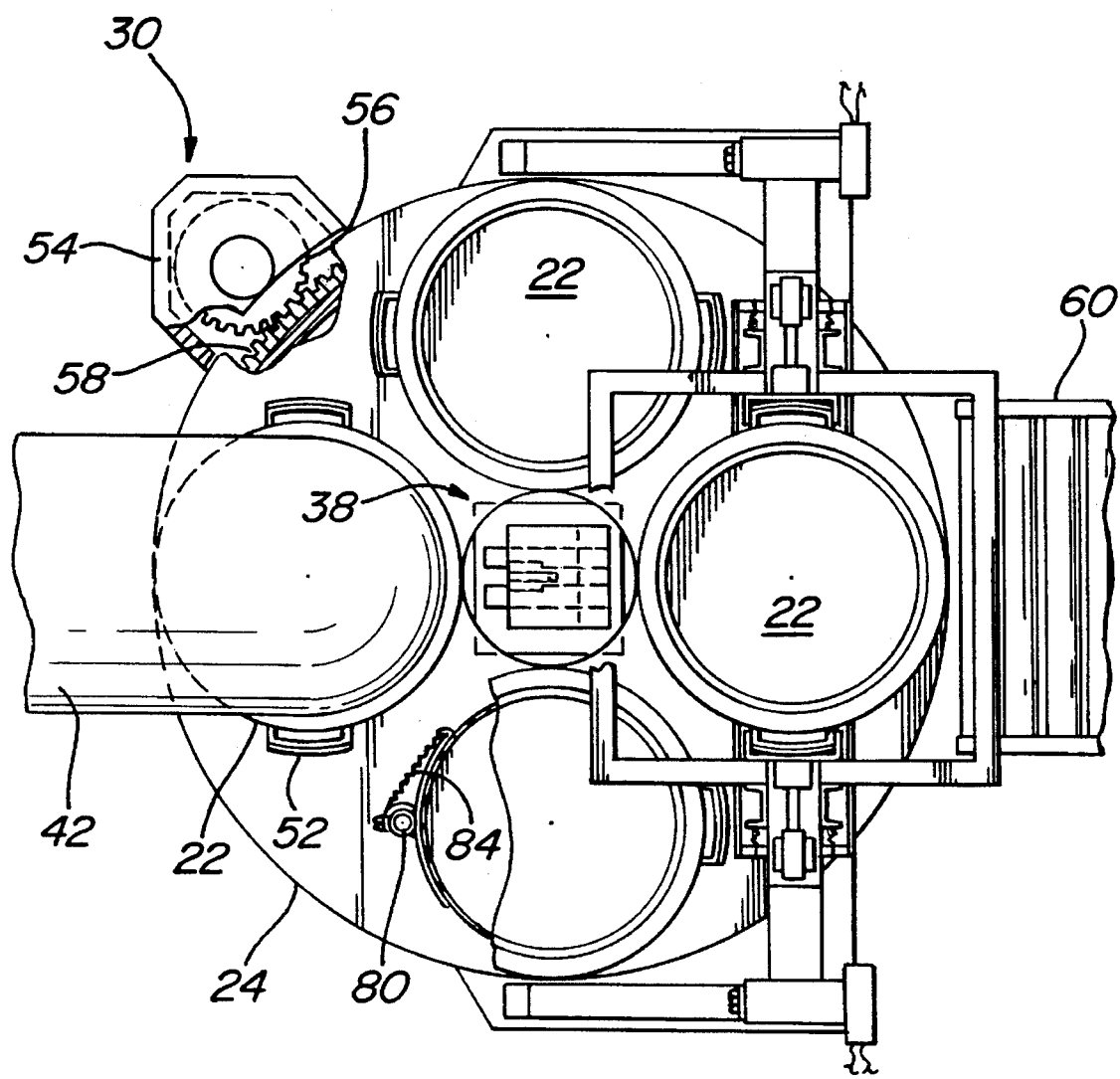
FIG. 3 is an enlarged top view of the platform holding a plurality of receptacles, the rotating mechanism therefor, above which is located the receptacle storage and replacement mechanism holding a plurality of empty receptacles to be placed onto the platform to replace filled receptacles, as needed.

As shown in FIG. 3, the platform 24 is generally circular in shape with four receptacles 22 placed thereon. The size and shape of the platform 24, and the size and number of receptacles 22 placed thereon can be varied depending upon the circumstances of use. For example, the shape of the platform 24 can be round, octagonal, etc. and can be, e.g., seven or eight feet in diameter. In FIG. 3, the receptacles shown are conventional 32 gallon plastic receptacles having handles 52 and the number and size can vary.

The platform 24 is rotated as desired by platform rotating mechanism 30 comprised of housing 54 for storing a conventional motor (not shown) or other suitable mechanism. Gear 56 is connected to gear 58 which is secured to the underside of platform 24 and enables the platform 24 to rotate as controlled by the controller (not shown). The particulars of the platform rotating mechanism 30 can vary depending upon the particular design features chosen for a particular location.

When each of the various receptacles 22 of the platform 24 reach a filled state, a sensor 112 connected to the controller (not shown), will sense such a state thereby requiring two actions. The filled receptacle 22A must be removed and an empty receptacle 22 must be placed on the platform 24 to receive more trash. While these two functions may be achieved manually, depending upon the embodiment of the present invention, the present invention achieves these functions by performing them automatically as shown in FIGS. 1,2,3 and 4.

Figure 4:
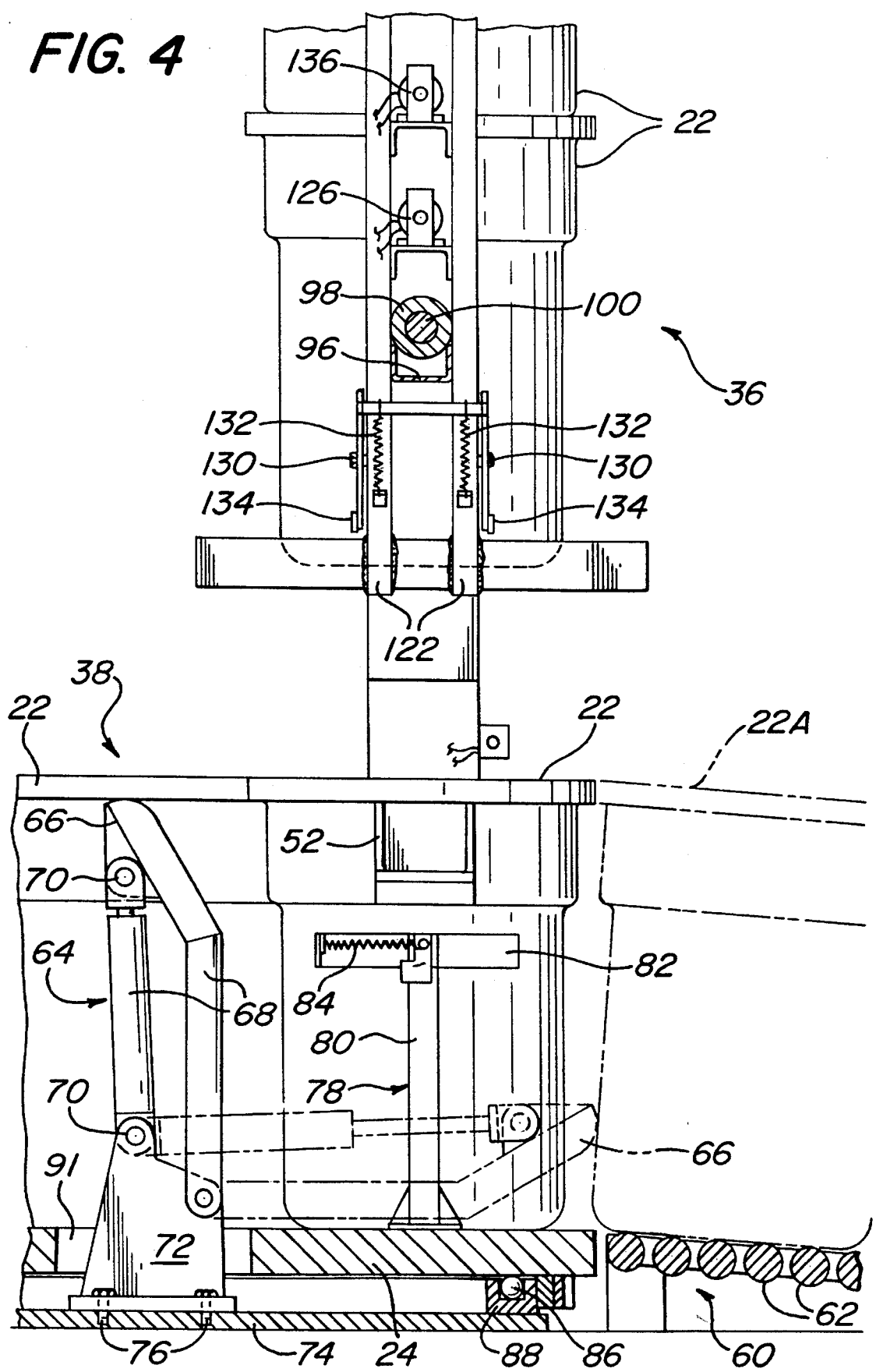
FIG. 4 is an enlarged partial side view of the receptacle storage and replacement mechanism located above the platform and plurality of receptacles, as a receptacle filled with trash is removed from the platform (shown in phantom) and replaced with an empty receptacle.

As shown in FIG. 4, to remove a filled receptacle 22A from platform 24, the sensor 112 will send a signal to the controller (not shown) to rotate the platform 24 by platform rotating mechanism 30 so that the discharged receptacle 22A can be discharged onto an adjacent ramp 60 which is comprised of a series of conventional rollers 62. In order to minimize space and design costs, only one such ramp 60 need be utilized per system 10, although this obviously can be varied. The discharged receptacle 22A filled with trash can then roll down the ramp 60.

In order to remove the filled receptacle 22A from platform 24, the controller (not shown) will send a signal to actuate the replacing mechanism 38 shown in FIG. 4, which is generally located in the central portion of platform 24 as shown in FIG. 3. The replacing mechanism 38 comprises a solenoid, motor or other mechanism (not shown) which actuates arm 64 to extend from a stored vertical position, to an actuated horizontal position shown in phantom. When the arm 64 extends horizontally, the distal end 66 of the arm 64 engages the filled receptacle 22A to push it onto ramp 60 so that it can roll to the desired location. The actuation of the arm 64 can be varied depending upon the desired characteristics, however the arm 64 shown in FIG. 4 is comprised of branches 68 which pivot about pivot points 70 and may comprise a typical piston or other means. The replacing mechanism 38 may include base 72 which may be secured to the platform 24 or floor 74 by conventional bolts 76 or other means.

To aid in the removal of a filled receptacle 22A onto the ramp 60 and to ensure they remain on the platform 24 when it is rotated, the system 10 further may include one or more securing arms 78, each of which includes a vertical leg 80 fixedly secured to platform 24. Vertical leg 80 is movably secured to horizontal leg 82 as tensioned by associated spring 84, which permits the horizontal leg 82 to move about vertical leg 80 as for example, when a receptacle 22A is pushed off the platform 24 by the replacing mechanism 38. Preferably, each receptacle 22 located on platform 24 has a pair of securing arms 78 oppositely disposed from one another to secure the receptacle in its appropriate place on platform 24 and to aid in the proper displacement of the receptacle 22A by the replacing mechanism 38 described herein.

In addition, in order to assist the platform 24 in rotating smoothly, especially when loaded with several receptacles filled with heavy trash, as shown in FIG. 4, the underside portion of platform 24 may have secured about the periphery thereof, a circular member 86 which rides in channel 88 which is secured to the floor 74 as the platform 24 pivots about pivot point 91.

Once a filled receptacle 22A has been properly removed from the platform to its desired location, the controller (not shown) may then actuate the dispenser 36 shown in FIGS. 2 and 4. The dispenser 36 comprises a frame 90 which stores a plurality of receptacles 22 above the platform 24. The frame 90 is merely exemplary and comprises vertical support members 92 having a pair of internally disposed angled frame members 94 which support horizontal members 96. The frame 90, as with the other components of the invention, may be comprised of any resilient material such as steel, iron, etc. and may be secured by conventional means, such as welding, bolts, etc.

The horizontal members 96 act as a support and point of rotation for the arms 98 which are secured to rods 100 and 102. Rod 100 is rotationally secured to arm 104 via pivot 106 which is rotationally secured to lower arm 108 which pivots about point 110 as sensed by a sensor (not shown) which communicates with the controller (not shown).

Frame 90 enables the approximately 90° rotation of the upper frame member 114 from a generally vertical receptacle storage position shown in FIG. 1, to a generally horizontal refilling position, shown in phantom in FIG. 1. By positioning the upper frame member 114 in the horizontal position, this enables a maintenance worker to refill the dispenser 36 with more empty receptacles 22, thereby obviating the need to do so by a ladder or other means to reach the top of the system and minimizing the amount of empty space which would otherwise be required above the system.

Upper frame member 114 comprises two opposed vertical frame members 116 which are secured to horizontal side members 118 to store a plurality of empty receptacles 22 in a nested position. The receptacles 22 are oriented so that their opposed handles 52 ride in channels 120 created by vertical channel members 122. The handle of each receptacle rests on movable horizontal flanges 124 which extend inwardly from the opposed vertical frame members 116. The horizontal flanges 124 extend inwardly toward each other to retain the receptacle 22 in a stored position. However, when a receptacle 22 is to be released from the receptacle dispenser 36 to the platform 24, each of the two horizontal flanges 124 holding an individual receptacle 22 to be released, move in the outward direction by solenoids 126 which are actuated by the controller (not shown). The flanges 124 move outward and the receptacle is released onto the platform. As the receptacle 22 lowers toward the platform 24, it is guided vertically to the platform by two opposed guide arms 128 which pivot about pivot 130 as tensioned by a conventional spring 132 located on each side of the receptacle 22. At the distal end of the guide arms 128 are rotationally secured wheels 134 which abut the exterior surface of the receptacle 22 to assist in guiding it to the platform 24 in the proper orientation.

Successive releases of receptacles 22 follow a similar pattern in that the next set of solenoids 136 are actuated to release another receptacle 22.

As shown in FIG. 1, the control panel 32 enables the tenant to select the desired type of trash to be deposited into the access door 16. As shown in FIG. 1, each category of trash has an associated button and indicator light adjacent the button. By pushing the appropriate button, the control panel 32 communicates to the controller (not shown) to place the diverter mechanism 20 in the proper orientation and to actuate the platform rotating mechanism 30, if necessary, to orient the desired receptacle 22 to receive the trash which will be deposited into the access door 16. The controller may include a delay feature which does not permit the access door 16 to open until the foregoing orientations are achieved, to prevent the tenant from introducing trash into the access door too early. In addition, the controller may include a locking feature (not shown) to permit only one access door 16 to be open at a time, to prevent two people on different floors 12 of the building from introducing trash simultaneously, especially if it is from different categories.

Alternatively, the system 10 may additionally comprise a smoke detector (not shown) located in the waste chute 14 below the diverting mechanism 20 and in communication with the controller. Should the detector sense smoke, it would signal the controller to actuate the diverting mechanism to close the upward path to prevent smoke from going up the waste chute 14 and signal the appropriate authorities.

Without further elaboration the foregoing will so fully illustrate my invention that others may, by applying current or future knowledge, adapt the same for use under various conditions of service.

I claim:

1. A system to separate and store trash which has been segregated into various categories for use in a multi-floor building, the system comprising:
    (a) a vertical waste chute with at least one access door to the chute located on a floor of the building, the chute having an upper and lower portion and a first path therethrough, the chute further including a second path which is angled respectively to the first path;
    (b) diverting means located adjacent the lower portion of the chute for diverting the path of the trash placed into the chute, from a first location comprising a plurality of trash receptacles located on a platform to a second location comprising at least one trash receptacle;
    (c) receptacle moving means for moving a selected one of the plurality of trash receptacles beneath the chute to receive a particular category of trash deposited into the chute;
    (d) control means for controlling the receptacle moving means, the control means including selection means for selecting the particular category of trash to be deposited into the access door and indicating means for indicating the category selected, the selection means and indicating means located adjacent each access door, the control means operatively connected to the receptacle moving means for selectively controlling the receptacle moving means;
    (e) dispensing means for dispensing at least one empty receptacle onto the platform to replace a receptacle which is removed from the platform after the receptacle is filled with trash;
    (f) replacing means for removing a receptacle filled with trash from the platform to allow the dispensing means to dispense an empty receptacle onto the platform, the replacing means comprising sensing means to sense when a receptacle on the platform is filled with trash and needs to be replaced with an empty receptacle; and
    (g) access door locking means connected to each door for locking the door while the receptacle moving means is in motion, the door locking means being operatively connected to the control means.

2. The system of claim 1 further comprising door sensing means at each access door for sensing when the door is open, the door sensing means being operatively connected to the control means for affecting operation based on the condition of a door being open.

3. The system of claim 2 wherein the control means locks all of the access doors except a particular door adjoining a selection means from which a selection has been most recently made for a predetermined time interval related to the opening of the particular door.

4. The system of claim 1 in which the receptacle moving means comprises a platform of the turntable type.

5. The system of claim 1 in which the receptacle moving means includes category means for ensuring that a receptacle dedicated from a particular category of waste is always located in a particular location in the receptacle moving means.

6. The device of claim 1 additionally comprising a smoke detector located below the diverting means.

* * * * *